(12) United States Patent
Susini et al.

(10) Patent No.: US 9,159,226 B2
(45) Date of Patent: Oct. 13, 2015

(54) ELECTRONIC APPLIANCE COVER ADAPTED AGAINST INFRARED RADIATION

(75) Inventors: Dominique Susini, Rueil-Malmaison (FR); Stéphane Hergault, Rueil-Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 455 days.

(21) Appl. No.: 13/060,459

(22) PCT Filed: Jul. 21, 2009

(86) PCT No.: PCT/FR2009/051454
§ 371 (c)(1),
(2), (4) Date: May 11, 2011

(87) PCT Pub. No.: WO2010/023387
PCT Pub. Date: Mar. 4, 2010

(65) Prior Publication Data
US 2011/0228172 A1    Sep. 22, 2011

(30) Foreign Application Priority Data
Sep. 1, 2008  (FR) .................................. 08 55842

(51) Int. Cl.
H04N 5/64   (2006.01)
G08C 23/04  (2006.01)
G02B 5/20   (2006.01)
G08C 25/00  (2006.01)

(52) U.S. Cl.
CPC ............. G08C 23/04 (2013.01); G02B 5/205 (2013.01); G08C 25/00 (2013.01)

(58) Field of Classification Search
USPC .......................................... 348/842
See application file for complete search history.

(56) References Cited

U.S. PATENT DOCUMENTS

| | | | |
|---|---|---|---|
| 4,738,266 A * | 4/1988 | Thatcher .................. | 600/473 |
| 5,959,105 A | 9/1999 | Harada et al. | |
| 6,012,814 A * | 1/2000 | Wood ..................... | 351/219 |
| 7,567,241 B2 * | 7/2009 | King et al. ............... | 345/179 |
| 2005/0190073 A1 | 9/2005 | Berges et al. | |
| 2006/0024037 A1 | 2/2006 | Tsutsumi et al. | |
| 2008/0266685 A1* | 10/2008 | Byers et al. ............. | 359/838 |
| 2008/0309801 A1* | 12/2008 | Cuccias .................. | 348/242 |
| 2009/0154933 A1* | 6/2009 | Mortensen ............... | 398/107 |
| 2009/0225303 A1* | 9/2009 | Giering et al. ........... | 356/71 |

FOREIGN PATENT DOCUMENTS

| | | |
|---|---|---|
| EP | 1 087 243 A1 | 3/2001 |
| WO | WO 95/12186 | 5/1995 |
| WO | WO 2007/024334 A1 | 3/2007 |

OTHER PUBLICATIONS

International Search Report corresponding to PCT/FR2009/051454, dated Dec. 29, 2009.

* cited by examiner

*Primary Examiner* — Tracy Li
(74) *Attorney, Agent, or Firm* — Pillsbury Winthrop Shaw Pittman LLP

(57) ABSTRACT

A cover of an electronic appliance capable of receiving infrared type signals from a remote monitoring device, the cover including a receiving area intended to be placed facing an infrared receiver of the electronic appliance, wherein the receiving area includes, placed at least partially in or on the receiving area, a filtering element configured to reduce the intensity of infrared signals received by the electronic appliance, the filtering element being constituted of an ink covering at least partially other areas of the cover.

10 Claims, 1 Drawing Sheet

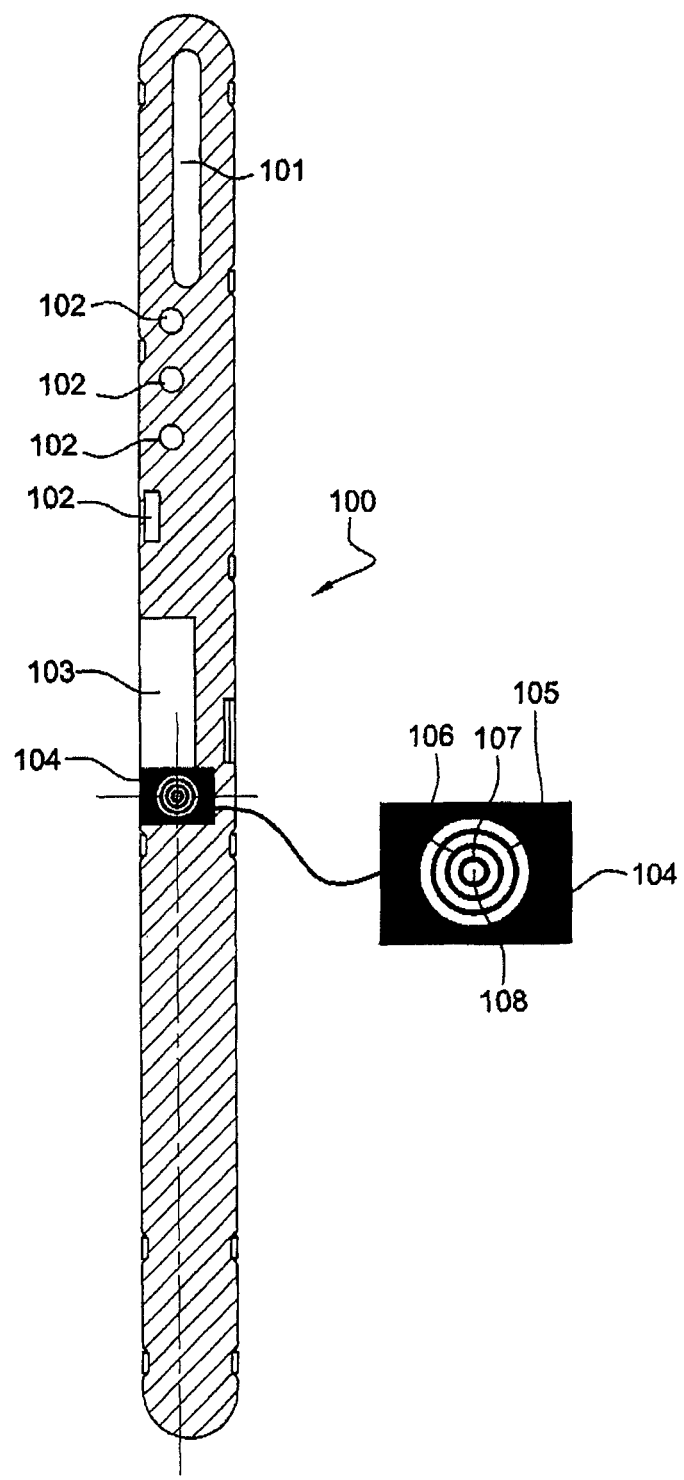

ELECTRONIC APPLIANCE COVER ADAPTED AGAINST INFRARED RADIATION

CROSS REFERENCE TO RELATED APPLICATIONS

This application is the U.S. National Stage of PCT/FR2009/051454, filed Jul. 21, 2009, which in turn claims priority to French Application No. 0855842, filed Sep. 1, 2008. The contents of both applications are incorporated herein by reference in their entirety.

TECHNICAL FIELD OF THE INVENTION

The object of the present invention is an electronic appliance cover adapted against infrared radiation type radiation. The essential goal of the invention is to eliminate certain malfunctions existing in electronic appliances operating in particular with infrared remote control type remote controls. The present invention will be more particularly described, by way of example only, in the case where the electronic appliance under consideration is of the digital television decoder type. However, the object of the invention extends to all electronic appliances capable of being utilized by means of an infrared remote control.

The field of the invention is, in general, that of electronic devices utilizing infrared remote controls. Such appliances are, for example, digital television decoders. In the digital television field, digital television decoders are essentially utilized to access a set of television services that are transmitted encrypted and that are decrypted within the decoder. Television decoders are interface devices, associated with modem type devices, between systems for transmitting television signals, particularly digital television signals in MPEG and DVB format, and display monitors, for example television sets.

TECHNOLOGICAL BACKGROUND OF THE INVENTION

Several years ago, new types of television sets appeared, and have met with great success. They are essentially LCD type television sets or plasma type television sets. Such television sets offer, in particular, significant esthetic differences with relation to cathode type television sets, in particular due to their thin thickness and due to the rendering quality of the video images that they offer.

However, since their appearance in homes, malfunctions in electronic appliances situated near these new types of television sets have been observed, particularly in digital television decoders that are associated with them. The malfunctions in question are linked to the use of the remote control: typically, a remote control causes, after a user presses an appropriate key of the remote control under consideration, an infrared type signal to be sent, whose frequency is associated with the command sent. This signal is received by an appropriate sensor situated on an accessible cover of the relevant electronic appliance. Generally, efficient remote controls today are designed so that an infrared signal that they transmit may be received up to a distance of twenty-five meters by the associated receiver, which is more than sufficient for domestic use.

A problem encountered with the use of new types of television sets is that they emit radiation, a relatively high amount in terms of intensity, in infrared frequencies. This radiation, which is random in terms of frequency, is then at least partially received by the infrared sensors of the electronic appliance, or electronic appliances, placed near the television sets under consideration.

But the intensity of this radiation is sometimes sufficient to saturate, at least occasionally, the infrared sensor under consideration. The infrared signal transmitted by the remote control may then no longer be correctly received and interpreted by the sensor under consideration; thus a malfunction of the remote control, which no longer correctly responds to commands transmitted by the remote control, is observed.

In the prior art, various solutions for remedying this problem are proposed. A first family of solutions consists, of a specific treatment on the glass of the television set under consideration such that the television no longer produces, or produces fewer, signals in infrared frequencies. Some solutions proposed even suggest adding a layer of glass type material onto the television set glass. The cost, non-esthetic character and complexity of such solutions make them inappropriate.

A second family of solutions consists of making electronic filters intended to be placed in the electronic appliance under consideration; but such solutions are particularly costly and complex to achieve, particularly due to the random character of the infrared signals transmitted by the television set under consideration. In addition, they are not effective when the intensity of infrared signals radiated by the television set saturates the infrared sensor of the appliance under consideration.

GENERAL DESCRIPTION OF THE INVENTION

The object of the invention proposes a solution to the problems and disadvantages that have just been stated. In the invention, a solution is proposed to limit the infrared signals transmitted by the television sets, or by any other infrared radiation source, for example certain types of bulbs, reaching the infrared sensor of the electronic appliance to be protected. For this purpose, having a filter on a cover of the electronic appliance to be protected at the level of an area situated facing the infrared sensor of the electronic appliance is proposed in the invention. The filter enables the intensity of the infrared signals received by the electronic appliance under consideration to be reduced, said signals thus no longer saturating the infrared sensor, the latter then being capable of receiving and interpreting the commands transmitted by an infrared type remote monitoring device. The filter according to the invention is advantageously simply constituted of a layer of ink placed at the receiving area of the cover.

The invention therefore essentially relates to an electronic appliance cover capable of receiving infrared type signals from a remote monitoring device, intended to be placed facing an infrared receiver of said electronic appliance, characterized in that said receiving area comprises, placed at least partially in or on said receiving area, a filtering element capable of reducing the intensity of infrared signals received by the electronic appliance, the filtering element particularly being constituted of ink covering at least partially other areas of said cover.

The electronic appliance cover according to the invention may comprise, in addition to the main characteristics that have just been mentioned in the preceding paragraph, one or more additional characteristics from among the following:
- the cover is made of a transparent material;
- the filtering element particularly comprises concentric rings;
- the number of concentric rings present in the filtering element equals three;
- the filtering element presents an ink-free central area.

The different additional characteristics of the cover according to the invention, inasmuch as they are not mutually exclusive, are combined according to all possible combinations to end in different examples of embodiment of the invention.

The present invention also refers to a digital television decoder comprising a cover presenting the main characteristics and possibly one or more additional previously mentioned characteristics.

The present invention also refers to a method of manufacturing a cover according to the invention of an electronic appliance capable of receiving infrared type signals from a remote monitoring device, said method particularly comprising the step consisting of placing ink by pad printing over a plurality of areas of said cover, said plurality of areas particularly comprising a receiving area intended to be placed facing an infrared receiver of said electronic appliance, said receiving area being covered at least partially by said ink.

The invention and its different applications will be better understood upon reading the following description and examining the accompanying single FIGURE.

BRIEF DESCRIPTION OF THE FIGURES

This is presented only for indicative and in no way limiting purposes of the invention.

FIG. 1, a single FIGURE, shows an example of embodiment of an electronic appliance cover according to the invention.

DESCRIPTION OF PREFERRED FORMS OF EMBODIMENT OF THE INVENTION

FIG. 1 shows an example of embodiment of cover 100 according to the invention. Cover 100 is intended to be placed and held, by any known means, on an electronic appliance capable of, receiving and interpreting infrared signals transmitted by at least one remote monitoring device, of the remote control type. Cover 100 is thus intended to be positioned at a face accessible by the infrared signals transmitted; most often, cover 100 is positioned at the front face of the electronic appliance under consideration.

Cover 100 presents several specific areas. In particular, the cover presents a slot 101 intended to receive a control card for television service acquired rights, particularly, in the case of a decoder. The cover also presents various holes 102 that are intended to leave the connectors provided on the face of the electronic appliance receiving cover 100 accessible. Advantageously, cover 100 is made of a transparent material, for example, plastic. Nothing prevents making such a cover in another material, for example, glass. In a known manner, a layer of ink is applied to the cover 100 according to a known pad printing process. Usually the ink, in a dark color, most often black, is applied to all of the areas of cover 100, with the exception of the openings mentioned, of an area 103, corresponding to an area intended to be positioned facing a display device of the electronic appliance under consideration, said display device being designed to present different types of information to a user, for, example, information of the time, service displayed, etc., type and with the exception of an area 104 known as the receiving area.

In the example of the invention represented, having ink on at least one part of the receiving area 104 is planned. The ink provided is advantageously the same ink as that provided by pad printing on the rest of the decoder cover, at the areas intended to receive the ink. Thus, the manufacturing method, particularly the pad printing step, of the cover according to the invention is not more complex than that known from the prior art. It is also not more expensive, only a small difference in the ink utilized shows a difference between the manufacturing method from the prior art and the manufacturing method according to the invention.

By covering at least partially receiving area 104 with ink, an effective filter is made for limiting the intensity of infrared signals traversing receiving area 104, thereby arriving at the infrared receiver of the electronic appliance under consideration. The drop in intensity produced by the presence of such a filter is sufficient to nullify, or at least significantly and sufficiently reduce, the infrared radiation emitted by the television sets, or by any other pollution source, for example certain bulbs. The infrared signals transmitted by the remote control may thus be correctly received and interpreted by the infrared sensor of the electronic appliance.

In the example illustrated, the filter provided at the receiving area 104 presents the form of a target, by being constituted of a plurality of ink rings, three in the example represented, referenced 105, 106 and 107, disposed concentrically, a central area 108 being left without ink. In other words, receiving area 104 presents four concentric rings left free of ink, with a solid central ring 108. Except for these four concentric rings left free of ink, the totality of the receiving area, overall rectangular in shape, is darkened by the ink.

Such a layout of the ink proves to be particularly effective for filtering infrared signals.

The invention claimed is:

1. A cover of an electronic appliance capable of receiving infrared type command signals from a remote control device, the electronic appliance cover comprising:
    a receiving area intended to be placed facing an infrared receiver of the electronic appliance, the receiving area including a filtering element placed at least partially in or on the receiving area and configured to reduce the intensity of infrared signals that potentially interfere with the reception of the infrared type command signals by the electronic appliance,
    wherein the filtering element is constituted of an ink covering partially the receiving area and at least partially other areas of the cover.

2. The electronic appliance cover according to claim 1, wherein the cover is made of a transparent material.

3. The electronic appliance cover according to claim 1, wherein the filtering element comprises concentric rings.

4. The electronic appliance cover according to claim 3, wherein the number of concentric rings present in the filtering element equals three.

5. The electronic appliance cover according to claim 3, wherein the filtering element presents an ink-free central area.

6. A digital television decoder comprising a cover according to claim 1.

7. A method of manufacturing a cover, according to claim 1, of an electronic appliance capable of receiving infrared type signals from a remote monitoring device, comprising providing ink by pad printing on a plurality of areas of said cover, said plurality of areas particularly comprising a receiving area intended to be placed facing an infrared receiver of said electronic appliance, said receiving area being partially covered by said ink.

8. The electronic appliance cover according to claim 1, wherein the other areas are spaced apart from the receiving area so that the other areas are provided on the cover without facing the infrared receiver.

9. The electronic appliance cover according to claim 1, wherein the ink is black.

10. An electronic apparatus configured with an infrared receiver to receive operational commands via infrared signals, the electronic apparatus comprising:
- a housing cover;
- a receiving area disposed on the housing cover and substantially facing the infrared receiver; and
- a filtering element placed at least partially in or on the receiving area of the housing cover and configured to reduce the intensity of ambient infrared radiation that potentially interferes with the reception of the infrared operational command signals by the infrared receiver, wherein the filtering element is constituted of an ink covering partially the receiving area and at least partially other areas of the housing cover.

* * * * *